United States Patent
Phanshikar et al.

(10) Patent No.: US 10,243,897 B2
(45) Date of Patent: *Mar. 26, 2019

(54) AUTOMATIC AND DYNAMIC MANAGEMENT OF INSTANT MESSENGER DO NOT DISTURB STATE VIA ENTERPRISE APPLICATION

(71) Applicant: INTERNATIONAL BUSINESS MACHINES CORPORATION, Armonk, NY (US)

(72) Inventors: Sanjay V. Phanshikar, Pune (IN); Hina Purohit, Pune (IN); Manish Singh, Wakad (IN); Mark A. Skurla, Doylestown, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,769

(22) Filed: Jun. 12, 2018

(65) Prior Publication Data
US 2018/0287975 A1 Oct. 4, 2018

Related U.S. Application Data

(63) Continuation of application No. 15/704,227, filed on Sep. 14, 2017, now Pat. No. 10,033,673, which is a (Continued)

(51) Int. Cl.
*H04L 12/58* (2006.01)

(52) U.S. Cl.
CPC ............ *H04L 51/063* (2013.01); *H04L 51/04* (2013.01); *H04L 51/26* (2013.01)

(58) Field of Classification Search
None
See application file for complete search history.

(56) References Cited

U.S. PATENT DOCUMENTS

| | | | |
|---|---|---|---|
| 7,056,217 B1 * | 6/2006 | Pelkey | A63F 13/12 463/25 |
| 7,272,633 B2 | 9/2007 | Malik et al. | |

(Continued)

FOREIGN PATENT DOCUMENTS

| | | |
|---|---|---|
| CA | 2498994 A1 | 8/2005 |
| CN | 104254056 A | 12/2014 |
| WO | 2004021687 A1 | 3/2004 |

OTHER PUBLICATIONS

Disclosed Anonymously, "Method and System for Establishing an Instant Messaging (IM) Communication Session Among Users Based on an Organizational Hierarchical Chart", IP.com No. IPCOM000206721D, IP.Com Electronic Publication Date: May 4, 2011, p. 1.

(Continued)

*Primary Examiner* — Angela Nguyen
(74) *Attorney, Agent, or Firm* — Anthony M. Pallone

(57) ABSTRACT

A method, computer program product, and system for peer to peer communication is provided. The embodiment may include receiving a message from a first user intended for a second. It may include determining whether the second user is in a do not disturb (DND) state. It may also include overriding the DND state of the second user. Overriding the DND state may include receiving static message information and user characteristics. Overriding the DND state may include determining if a critical situation (critsit) exists. Overriding the DND state may include determining a message critsit value for the users. Overriding the DND state may include adding the first user and the second to a critsit users list. The embodiment may include overriding the DND state of the second user if both users are on the same list. The embodiment may include transmitting messages from the first user to the second user.

1 Claim, 6 Drawing Sheets

Related U.S. Application Data continuation of application No. 15/415,334, filed on Jan. 25, 2017.

(56) References Cited

U.S. PATENT DOCUMENTS

| | | | |
|---|---|---|---|
| 7,480,696 | B2 | 1/2009 | Kirkland et al. |
| 7,606,866 | B2 | 10/2009 | Mora |
| 7,856,213 | B2 | 12/2010 | Xue et al. |
| 7,917,589 | B2 | 3/2011 | Kronlund et al. |
| 8,355,491 | B1 | 1/2013 | Butt |
| 8,611,272 | B1 | 12/2013 | Hertzfeld et al. |
| 8,625,749 | B2 | 1/2014 | Jain et al. |
| 8,874,660 | B2 | 10/2014 | Denner et al. |
| 9,137,049 | B2 | 9/2015 | Varoglu et al. |
| 9,380,158 | B2 | 6/2016 | Hayes et al. |
| 2005/0192039 | A1 | 9/2005 | Xue et al. |
| 2006/0078105 | A1 | 4/2006 | Kom et al. |
| 2007/0223662 | A1 | 9/2007 | Jain et al. |
| 2009/0172103 | A1 | 7/2009 | Tuli |
| 2010/0169431 | A1* | 7/2010 | Denner ............... G06F 15/16 709/206 |
| 2010/0174788 | A1 | 7/2010 | Vitaldevara et al. |
| 2011/0119192 | A1 | 5/2011 | Facemire et al. |
| 2013/0332540 | A1 | 12/2013 | Vadhavkar |
| 2014/0282003 | A1* | 9/2014 | Gruber ............... G06F 3/16 715/727 |

OTHER PUBLICATIONS

IBM, "An Multi-Level Do-Not-Disturb System", IP.com No. IPCOM000173239D, IP.com Electronic Publication Date: Jul. 28, 2008, p. 1.

Mell et al., "The NIST Definition of Cloud Computing", Recommendations of the National Institute of Standards and Technology, Special Publication 800-145, Sep. 2011, 7 pages.

Hike, "How to send an SMS to a Number registered on DND?", http://support.hike.in/entries/21771850-How-to-send-an-SMS-to-a-number-registered-on-DND-, printed on Nov. 2, 2106, p. 1.

Wowwiki, "API SendChatMessage", printed Nov. 2, 2016, pp. 1-3, http://wowwiki.wikia.com/wiki/API_SendChatMessage.

Cisco, "Cisco Jabber for Windows 10.5 Release Notes", Jun. 19, 2015, pp. 1-6, http://www.cisco.com/c/en/us/td/docs/voice_ip_comm/jabber/Windows/10_5/rn/JABW_BK_J559CFFB_00_jabber-windows-release-notes-10-5/introduction.html#JABW_TP_NFEBA125_00.

U.S. Appl. No. 15/415,334, titled "Automatic and Dynamic Management of Instant Messenger Do Not Disturb State Via Enterprise Application", filed Jan. 25, 2017, 36 Pages.

U.S. Appl. No. 15/704,227, titled "Automatic and Dynamic Management of Instant Messenger Do Not Disturb State Via Enterprise Application", filed Sep. 14, 2017, 32Pages.

IBM: List of IBM Patents or Patent Applications Treated as Related (Appendix P), Jun. 12, 2018, pp. 1-2.

Phanshikar et al., U.S. Appl. No. 16/005,762, filed Jun. 12, 2018, titled "Automatic and Dynamic Management of Instant Messenger Do Not Disturb State Via Enterprise Application," pp. 1-32.

* cited by examiner

AUTOMATIC AND DYNAMIC MANAGEMENT OF INSTANT MESSENGER DO NOT DISTURB STATE VIA ENTERPRISE APPLICATION

BACKGROUND

The present invention relates to the Do Not Disturb (DND) feature of Instant Messenger (IM) applications, and more specifically, to automatically updating the DND privileged users list via enterprise applications.

An IM user may block messages sent from other Instant Messenger users by enabling the DND. However, a user in an active DND state may nevertheless receive messages from other users if those other users are on the user's privileged users list. Traditionally, the user manually updates the user's list of privileged users every time the user wants to add or delete a privileged user.

BRIEF SUMMARY

An embodiment of the invention may include a method, computer program product and system for peer to peer communication. The embodiment may include receiving a message from a first communication program user intended for a second communication program user. The embodiment may include determining whether the second communication program user is in a do not disturb state. The embodiment may include determining whether to override the do not disturb state of the second communication program user based on the second communication program user being in a do not disturb state. Determining whether to override the do not disturb state may include receiving static message information and communication program user characteristics. The static message information may include metadata describing a message and content of the message. The communication program user characteristics may describe user employment characteristics and user communication program preferences of a user included on a communication. Determining whether to override the do not disturb state may include determining if a critical situation (critsit) exists based on the received static message information. Based on the existence of a critsit, determining whether to override the do not disturb state may include determining a message critsit value for the user based on the received communication program user characteristics. Determining whether to override the do not disturb state may include adding the first communication program user and the second communication program user to a critsit users list based on determining that the calculated message critsit value exceeds a minimum threshold value. The embodiment may include determining to override the do not disturb state of the second communication program user based on determining that the first communication program user and the second communication program user are on the same critsit users list. The embodiment may include transmitting messages from the first communication program user to the second communication program user based on determining that the do not disturb state of the second communication program user should be overridden.

DETAILED DESCRIPTION

Embodiments of the present invention will now be described in detail with reference to the accompanying Figures.

Many organizations today use various communication programs (e.g. email, IM) to enable employee collaboration and to facilitate day to day operations. The ability for a user to enable a do not disturb (DND) setting and block messages from other users is a popular feature within many of such communication programs. Moreover, a user of such a communication program typically has the option to create a list of privileged users, whose messages are received notwithstanding the user's active DND state. Presently, the mechanism for overriding a DND state via the list of privileged users is static in nature and a manual task, as the user must update the list every time privileged users are added or deleted. However, in some critical situations (critsit), the user may not be able to update the privileged user list and therefore may block a critical communication from a non-privileged user, which may have negative impact in terms of business for an organization. Such a situation may arise in an enterprise where collaborative applications can notify each other of the occurrence of some event. As an example, consider an organization utilizing a customer ticketing application and an instant messaging application. An event may occur within the customer ticketing application which triggers a critical situation. The customer ticketing application may notify the instant messaging application of the critical situation to facilitate communication between responsible persons. The instant messaging application may then need to take some action (e.g., override the DND state of a responsible person) or communications between responsible persons may be blocked.

To avoid a situation where a critical communication is blocked, a DND evaluation system 100, described below, performs a method for evaluating the active DND status of a user whereby a temporary list of privileged users, called critsit users, may be automatically generated based on message content and other factors. The method may then instruct the communication program to allow the listed critsit users to send messages for the user in an active DND state.

Figure 1:
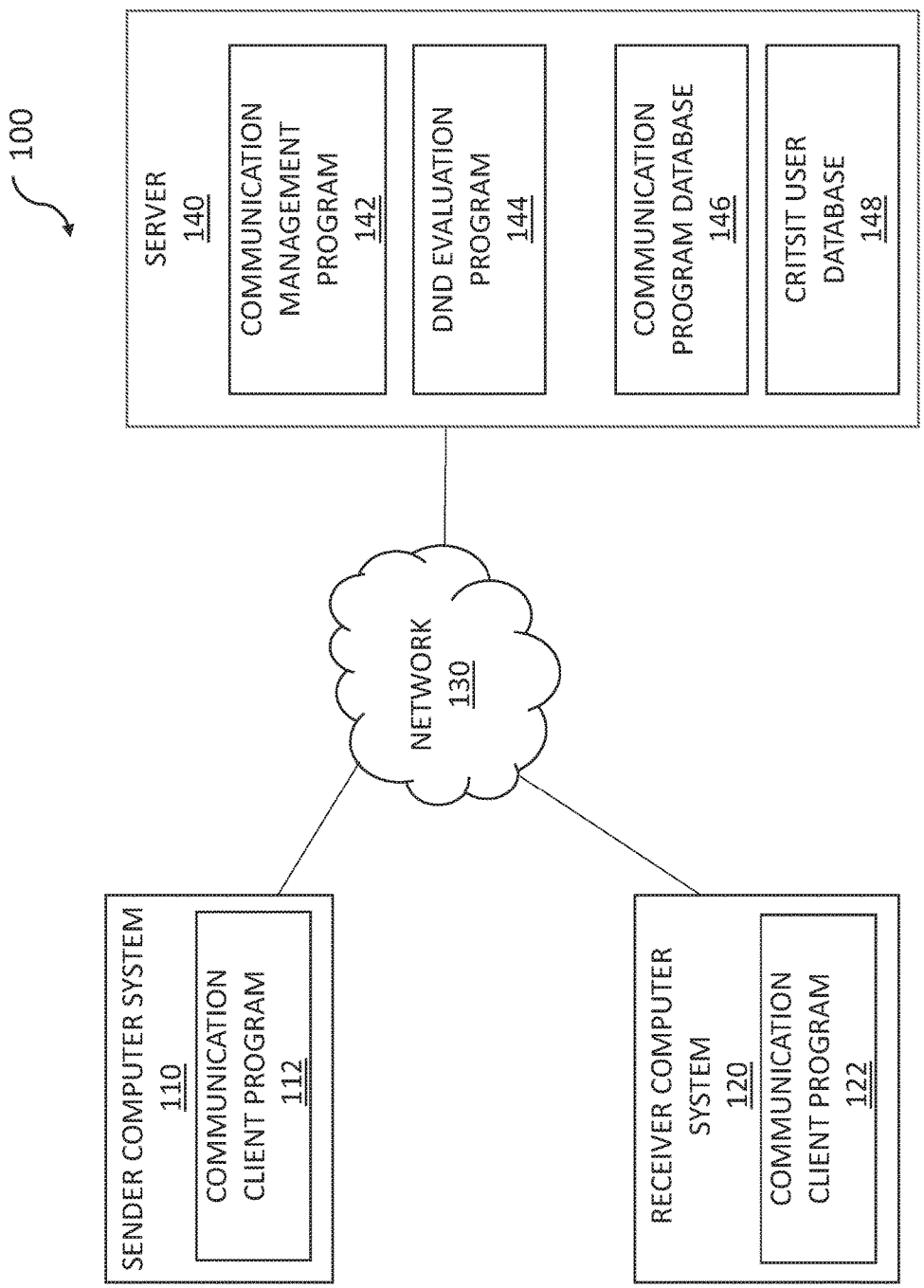
FIG. 1 is a functional block diagram illustrating a DND evaluation system, in accordance with an embodiment of the present invention.

FIG. 1 is a functional block diagram illustrating DND evaluation system 100, in accordance with an embodiment of the present invention. DND evaluation system 100 may be a distributed communication environment, including sender computer system 110, receiver computer system 120, and server 140 interconnected via network 130.

Network 130 may be implemented as, for example, a local area network (LAN), a wide area network (WAN) such as the Internet, or a combination of the two. Network 130 may include, for example, wired, wireless or fiber optic connections. In general, network 130 may be any combination of connections and protocols that will support communications between sender computer system 110, receiver computer system 120, and server 140, in accordance with an embodiment of the invention.

Sender computer system 110 may include a communication client program 112. Sender computer system 110 may be a desktop computer, a notebook, a laptop computer, a tablet computer, a handheld device, a smartphone, a thin client, or any other electronic device or computing system capable of sending a communication to other computing devices such as receiver computer system 120 and server 140 via network 130. In an example embodiment, sender computer system 110 may send a communication to receiver computer system 120. However, in other embodiments, the roles of sender computer system 110 and receiver computer system 120 may be reversed and sender computer system 110 may also receive communications. Furthermore, in an example embodiment, sender computer system 110 may send a text-based message (e.g. IM, email). However, sender computer system 110 may also be capable of sending audio messages (e.g. phone calls), video messages (e.g. video conferences, and combinations thereof. Sender computer system 110 is described in more detail with reference to FIG. 4.

Communication client program 112 is a program situated on sender computer system 110 that may send a message to communication client program 122, located on receiver computer system 120. Communication client program 112 may include components used to send a message from sender computer system 110 to communication client program 122, via communication management program 142. Communication client program 112 may also include components used to send and receive information to and from users of sender computer system 110. In an example embodiment, communication client program 112 may send a text based communication (e.g. IM, email). However, communication client program 112 may also send audio messages (e.g. phone calls), video messages (e.g. video conferences, and combinations thereof. Furthermore, in other embodiments, communication client program 112 may also receive communications from communication client program 122, via communication management program 142.

Receiver computer system 120 may include a communication client program 122. Receiver computer system 120 may be a desktop computer, a notebook, a laptop computer, a tablet computer, a handheld device, a smartphone, a thin client, or any other electronic device or computing system capable of receiving a communication from other computing devices such as sender computer system 110 and server 140 via network 130. In an example embodiment, receiver computer system 120 may receive a communication from sender computer system 110. However, in other embodiments, the roles of receiver computer system 120 and sender computer system 110 may be reversed and receiver computer system 120 may also send communications. Furthermore, in an example embodiment, receiver computer system 120 may receive a text-based message (e.g. IM, email). However, receiver computer system 120 may also be capable of receiving audio messages (e.g. phone calls), video messages (e.g. video conferences, and combinations thereof. Receiver computer system 120 is described in more detail with reference to FIG. 4.

Communication client program 122 is a program situated on receiver computer system 120 that may receive a message sent from communication client program 112, located on sender computer system 110. Communication client program 122 may include components used to receive a message sent from communication client program 112, via communication management program 142. Communication client program 122 may also include components used to send and receive information to and from users of receiver computer system 120. In an example embodiment, communication client program 122 may receive a text-based communication (e.g. IM, email). However, communication client program 122 may also receive audio messages (e.g. phone calls), video messages (e.g. video conferences), and combinations thereof. Furthermore, in other embodiments, communication client program 122 may also send communications to communication client program 112, via communication management program 142.

Server 140 may include a communication management program 142, a DND evaluation program 144, a communication program database 146, and a critsit user database 148. Server 140 may be a desktop computer, a notebook, a laptop computer or any other electronic device or computing system capable of receiving and sending data to and from other computing devices such as sender computer system 110 and receiver computer system 120 via network 130, and capable of hosting DND evaluation program 144. Although not shown, optionally, server 140 may comprise a cluster of servers executing the same software to collectively process and monitor the communications between other computing devices such as sender computer system 110 and receiver computer system 120. Server 140 is described in more detail with reference to FIG. 4.

Communication program database 146 may be a database containing message information and communication client program user (i.e. user of communication client program 112, user of communication client program 122) characteristics obtained from communication management program 142, according to the embodiments of the invention. Communication program database 146 may store static message information such as, for example, message content, a message critsit flag, a message priority level, employment characteristics relating to the sender (e.g. job title, role, project assignments, management chain), and employment characteristics relating to the recipient (e.g. job title, role, project assignments, management chain). Communication program database 146 may also store user communication program preferences (e.g. privileged users list, DND status) for each communication program user (i.e. user of communication client program 112, user of communication client program 122). Additionally, communication program database 146 may also store a temporary list of users identified by DND evaluation program 144. In an example embodiment, communication program database 146 receives the message content and user characteristics from communication management program 142, regarding messages between users of communication client program 112 and communication client program 122.

Communication management program 142 may be a software program configured to facilitate and monitor communication requests between communication client program 112 and communication client program 122. In an example embodiment, communication management program 142 may be an enterprise level software program that acts as an intermediary between communication client program 112 and communication client program 122. Communication management program 142 may receive a message sent from communication client program 112 and may relay the message to communication client program 122. Furthermore, in an example embodiment, communication management program 142 may also perform other tasks such as, collect static message information and communication client program user characteristics (i.e. user of communication client program 112, user of communication client program 122), assess the DND status of communication client program 122, and access the privileged users list for communication client program 122. Additionally, communication management program 142 may block or redirect messages intended for communication client program 122 when communication client program 122 is in a DND state, or override the DND state according to DND evaluation program 144. Furthermore, in an optional embodiment, communication management program 142 may, upon input received from DND evaluation program 144, instruct communication client program 112 and communication client program 122 to update their respective user interfaces with a visual indicator for each communication client program (i.e. communication client program 112, communication client program 122) identified by DND evaluation program 144. In another optional embodiment, communication management program 142 may, upon input received from DND evaluation program 144, instruct communication client program 112 and communication client program 122 to remove the visual indicator from their respective user interfaces for each communication client program (i.e. communication client program 112, communication client program 122) no longer identified by DND evaluation program 144. In yet another optional embodiment, communication management program 142 may, upon notification from DND evaluation program 144, instruct communication client program 112 and communication client program 122 to prompt their respective users with an option to update their privileged users list based on information received from DND evaluation program 144. The operations and functions of communication management program 142 are described in further detail below with regard to FIG. 3.

Critsit user database 148 may be a database containing communication client program (i.e. communication client program 112, communication client program 122) characteristics obtained from DND evaluation program 144, in accordance with the embodiments of the invention. Critsit user database 148 may store a list of each communication client program user (i.e. user of communication client program 112, user of communication client program 122) identified by DND evaluation program 144 as a critsit user. Critsit user database 148 may also store a list of keywords and key phrases which convey urgency, or which are used commonly in a critical situation. Additionally, critsit user database 148 may also store, for each identified critsit user, a critsit list number and a message critsit value (MCV). The critsit list number may identify the list or lists to which the critsit user is assigned. In an example embodiment, critsit user database 148 may store more than one list and the critsit user may be assigned to one or more lists. The message critsit value may represent the importance of the critsit user to the critical situation. In an example embodiment, a critsit user who is directly responsible for a critical situation may have a higher assigned message critsit value than a critsit user who is less directly involved in the critical situation. The critsit users list, the critsit list number, and the message critsit value are obtained from DND evaluation program 144. In an example embodiment, critsit user database 148 may receive a critsit users list from DND evaluation program 144 which identifies communication client program 112 and communication client program 122 as critsit users. Critsit user database 148 may also receive a critsit list number associated with both communication client program 112 and communication client program 122. Furthermore, critsit user database 148 may receive differing or similar MCVs for communication client program 112 and communication client program 122.

DND evaluation program 144 is a software application or configuration in a software application capable of evaluating whether or not to enforce the DND status of communication client program 122. In an example embodiment, an instance of DND evaluation program 144 begins execution following the user of communication client program 112 setting a critical situation (critsit) flag and sending the communication intended for communication client program 122. In another example embodiment, DND evaluation program 144 may launch in response to a timed system interval. Additionally, in either example embodiment, DND evaluation program 144 may query communication program database 146 to analyze the static message information relating to the message intended for communication client program 122. DND evaluation program 144 may then determine if a critical situation exists, based on the static message information retrieved. If a critical situation exists, DND evaluation program 144 may calculate a message critsit value for communication client program 112 and communication client program 122. DND evaluation program 144 may then add communication client program 112 to a critsit users list from which communication client program 122 may temporarily update its privileged users list and thereby disable its DND with regard to communication client program 112. The operations and functions of DND evaluation program 144 are described in further detail below with regard to FIG. 2.

Figure 2:
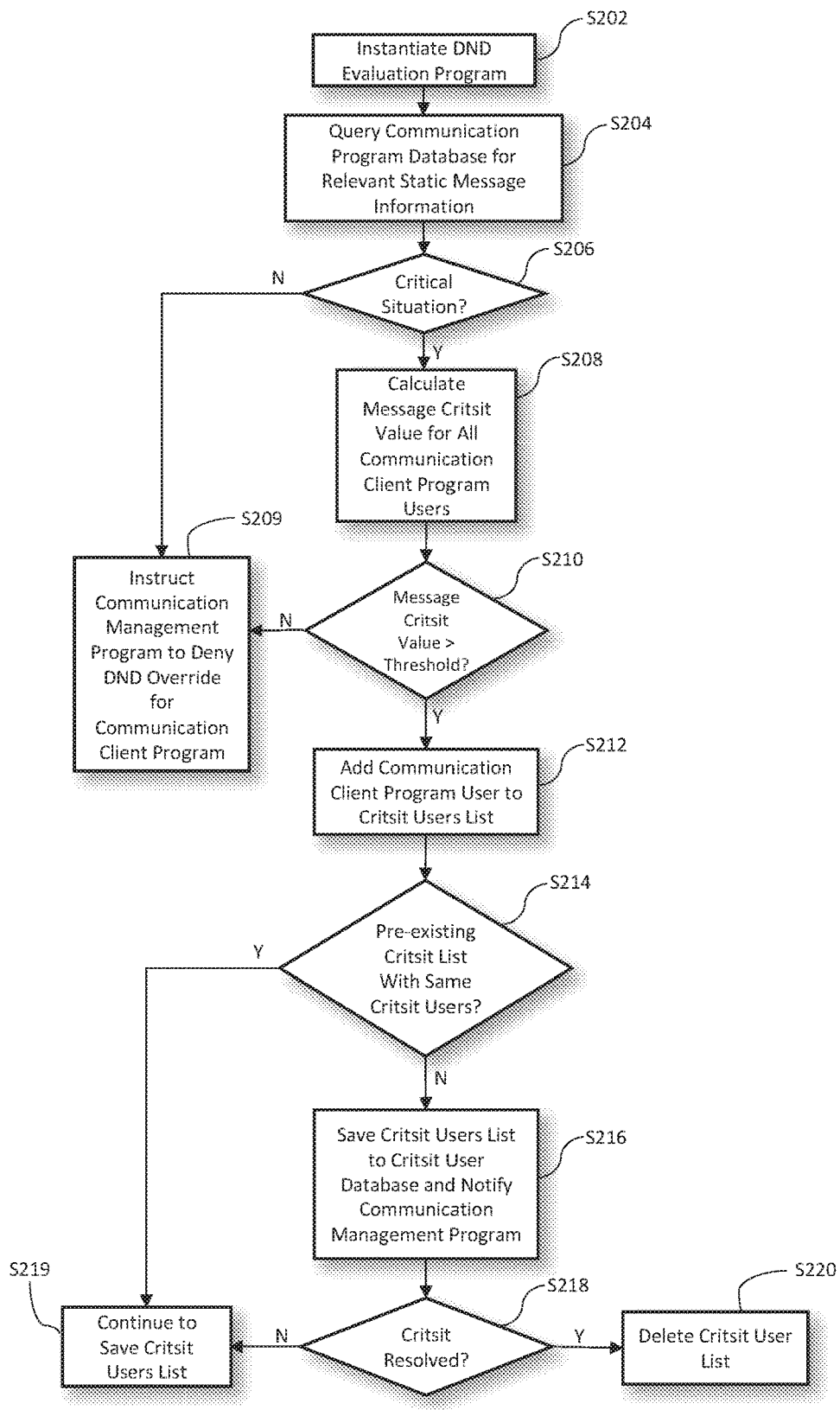
FIG. 2 is a flowchart illustrating the operations of the DND evaluation program of FIG. 1, in accordance with an embodiment of the invention.

FIG. 2 shows a flowchart illustrating the operations of DND evaluation program 144 in accordance with an embodiment of the invention. Referring to step S202, an instance of DND evaluation program 144 is executed. DND evaluation program 144 may be launched in response to a user of a communication client program (i.e. communication client program 112, communication client program 122) setting a critical situation (critsit) flag and sending the communication. DND evaluation program 144 may also be launched in response to a timed system interval wherein communications sent in the previous interval are evaluated for a critical situation. Furthermore, DND evaluation program 144 may launch in response to receiving a critical situation notification from a collaborative enterprise application. In an example embodiment, the user of communication client program 112 may mark a communication as critical by setting a message critsit flag. DND evaluation program 144 may be automatically executed once the user of communication client program 112 sends the critsit flagged communication. In another example embodiment, DND evaluation program 144 may be configured to execute and evaluate communications from communication client program 112 after a preconfigured period of time, such as once every minute.

Referring to step S204, DND evaluation program 144 may query communication program database 146 for the relevant static message information and user characteristics for every involved communication client program user (i.e. user of communication client program 112, user of communication client program 122). In an example embodiment, the query may retrieve message content, message critsit flag, message participants, characteristics relating to the sender (e.g. job title, role, management chain, project assignments), and characteristics relating to any recipient (e.g. job title, role, management chain, project assignments, DND status). In another example embodiment, the retrieved static message information and user characteristics may relate to the critsit flagged communication sent by the user of communication client program 112. In yet another example embodiment, the retrieved static message information and user characteristics may relate to any communications sent by the user of communication client program 112 after a preconfigured period of time. In an optional embodiment, where DND evaluation program 144 is launched in response to receiving a critical situation notification from a collaborative enterprise application, DND evaluation program 144 may query the enterprise application database for information relating to the critical situation.

Referring to step S206, DND evaluation program 144 may determine if a critical situation exists based on the static message information retrieved in step S204. In determining the existence of a critical situation, DND evaluation program 144 may parse the content of a communication looking for words or phrases that match with a list of predefined terms stored on critsit user database 148. DND evaluation program 144 may also determine that a critical situation exists if the static message information retrieved in step S204 contains a user set message critsit flag. If a critical situation exists, DND evaluation program 144 proceeds to step S208. If a critical situation does not exist, DND evaluation program 144 proceeds to step S209. In an example embodiment, DND evaluation program 144 may parse through the content of a message sent from communication client program 112 and find that a critical situation exists based on words or phrases used in the message which match with keywords or key phrases retrieved from critsit user database 148.

Referring to step S208, DND evaluation program 144 calculates a message critsit value (MCV) for every involved communication client program user (i.e. user of communication client program 112, user of communication client program 122), based on the static message information and communication client program user characteristics retrieved in step S204. In computing the message critsit value for a communication client program user, DND evaluation program 144 may use a weighted value for each user characteristic (e.g. job title, role, management chain, project assignments, organizational charts) and add the weighted values together to derive the user's MCV. In an example embodiment, MCV may be represented by the equation $MCV=W_1+W_2+ \ldots W_N$ where W is the characteristic weight. The higher the MCV, the more important that user is to the critical situation and the more likely it is that the user's DND will bypassed. DND evaluation program 144 may temporarily store the MCV for every involved communication client program user in critsit user database 148. In an example embodiment, if the user of communication client program 112 is directly responsible in a critical situation, as indicated by their job title characteristic or role characteristic, the weighed values associated with those characteristics may be higher than if those characteristics indicated that the user of communication client program 112 was only indirectly responsible in a critical situation. Furthermore, in an example embodiment, the user of communication client program 122 may be possess the characteristic of being the first line report or manager in a critical situation, according to organizational charts. As such, the user of communication client program 122 would have a higher weighted value associated with that characteristic than if the user of communication client program 122 possessed the characteristic of being a second or third line report or manger, according to organizational charts.

Referring to step S210, DND evaluation program 144 determines if the message critsit value for an involved communication client program user (i.e. user of communication client program 112, user of communication client program 122) is greater than a predetermined threshold value. The threshold value may be a defined value set by DND evaluation program 144 and it may represent a minimum level of user importance that a communication client program user must exceed to necessitate involvement in the critical situation and bypass DND. DND evaluation program 144 compares the MCV of every involved communication client program user (i.e. user of communication client program 112, user of communication client program 122) against the threshold value. If the message critsit value is less than the threshold value, DND evaluation program 144 proceeds to step S209. If the message critsit value is greater than the threshold value, DND evaluation program 144 proceeds to step S212.

Referring to step S209, DND evaluation program 144 instructs communication management program 142 to deny DND override for one or more communication client programs (i.e. communication client program 112, communication client program 122). In an example embodiment, where DND evaluation program 144 has determined, in step S206, that a critical situation does not exist, DND evaluation program 144 instructs communication management program 142 to deny DND override for every involved communication client programs (i.e. communication client program 112, communication client program 122). In another example embodiment, where the MCV for communication client program 122 is below the threshold value in step S210, DND evaluation program 144 instructs communication management program 142 to deny DND override for communication client program 122. Additionally, in an optional embodiment, DND evaluation program 144 may notify communication management program 142 that one or more communication client programs (i.e. communication client program 112, communication client program 122) were not placed on a critsit users list.

Referring to step S212, DND evaluation program 144 identifies a communication client program user (i.e. user of communication client program 122) as a critsit user by adding the communication client program user to a critsit users list. DND evaluation program 144 may add one or more critsit users to the same critsit users list. DND evaluation program 144 may also generate a unique critsit list number for each list created and assign that critsit list number to the listed critsit users. In an example embodiment, DND evaluation program 144 identifies the user of communication client program 112 and the user of communication client program 122 as critsit users, places them on the same critsit users list, generates a unique critsit list number for that critsit users list, and assigns the critsit list number to the user of communication client program 112 and to the user of communication client program 122.

Referring to step S214, DND evaluation program 144 may query critsit user database 148 to determine if there is a pre-existing critsit users list with critsit user entries identical to the critsit users list generated in step S212. If there is a pre-existing matching critsit users list, DND evaluation program 144 proceeds to step S219. If there is not a pre-existing matching critsit users list, DND evaluation program 144 proceeds to step S218.

Referring to step S216, DND evaluation program 144 may save the critsit users list, generated in step S212, to critsit user database 148. DND evaluation program 144 may also notify communication management program 142 of the newly generated critsit users list stored on critsit user database 148. In an example embodiment, DND evaluation program 144 saves the critsit users list containing communication client program 112 and communication client program 122 to critsit user database 148 and notifies communication management program 142.

Referring to step S218, DND evaluation program 144 determines if the critical situation has been resolved. DND evaluation program 144 may determine that a critical situation has been resolved through input from a communication client program user (i.e. user of communication client program 112, communication client program 122). If the critical situation has not been resolved, DND evaluation program 144 proceeds to step S219. If the critical situation has been resolved, DND evaluation program 144 proceeds to step S220. In an example embodiment, DND evaluation program 144 may receive input from communication management program 142 that the user of communication client program 112 has turned off the critsit flag in a communication that was previously flagged as critical. DND evaluation program 144 may then delete the critsit users list associated with that previously flagged communication.

Referring to step S219 DND evaluation program 144 may continue to save an existing critsit users list. In an example embodiment, DND evaluation program 144 may continue to save the critsit users list from step S212 in critsit user database 148 until the critical situation has been resolved.

Referring to step S220, DND evaluation program 144 may delete a critsit users list in response to determining that a critical situation is resolved. In an example embodiment, DND evaluation program 144 deletes the critsit users list, created in step S212, from critsit user database 148. In an optional embodiment, DND evaluation program 144 may notify communication management program 142 that the critsit users list has been deleted from critsit user database 148.

As an illustrative example, according to step S202, DND evaluation program 144 may launch in response to the identification of a critsit event in a collaborative enterprise application such as a customer ticketing system. In such an embodiment, DND evaluation program 144 may receive notification of a critical ticket from the customer ticketing system. DND evaluation program 144 may also receive information related to the critsit event, including details about the employees assigned to work on the critical ticket, according to step S204. DND evaluation program 144 may then add every employee assigned to the critical ticket to a critsit users list, according to step S212, from which communication client program 122 may temporarily update each employees' privileged users list and thereby disable any existing do not disturb states among the employees assigned to work on the critical ticket.

Figure 3:
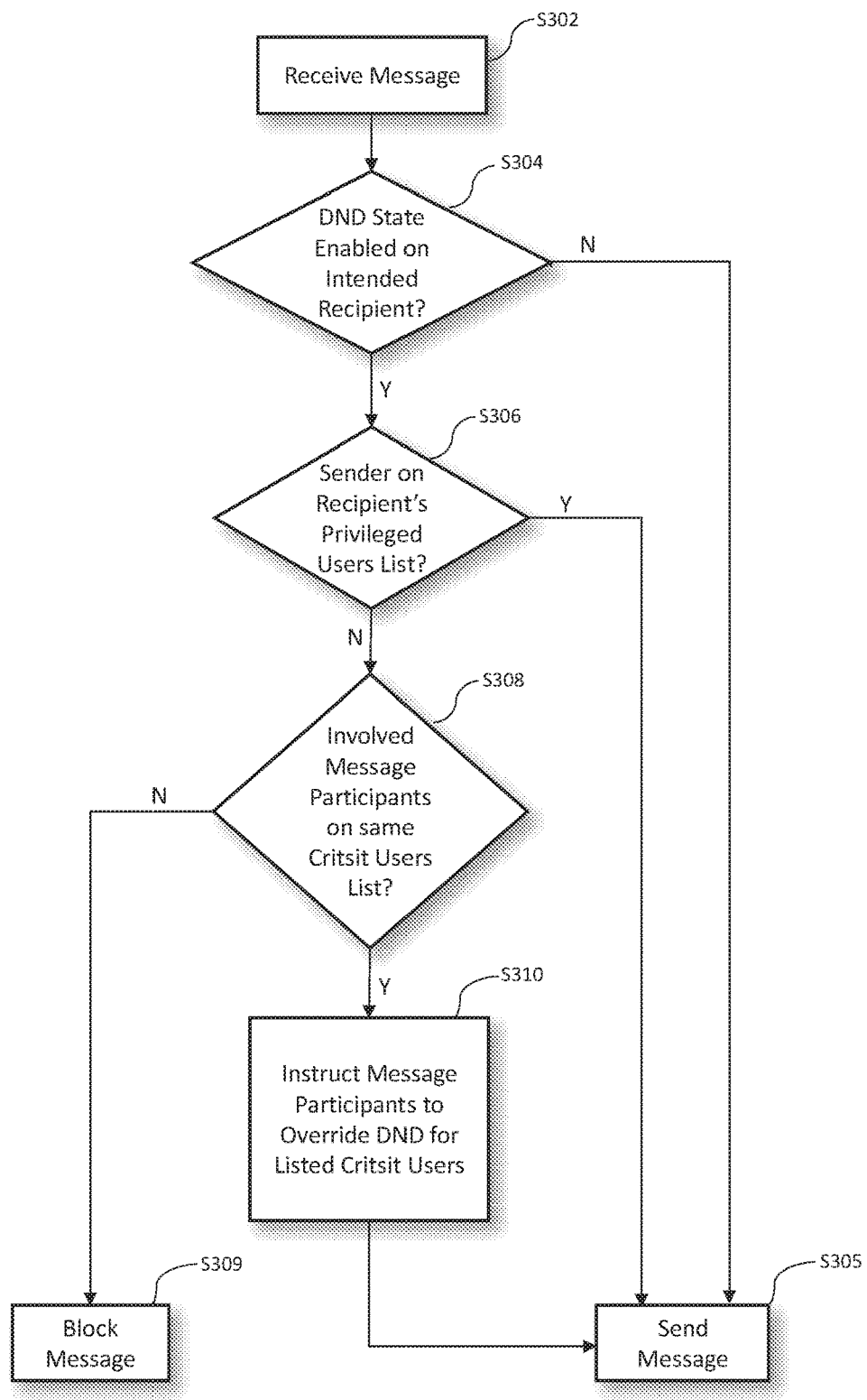
FIG. 3 is a flowchart illustrating the operations of the Communication management program of FIG. 1, in accordance with an embodiment of the invention.

FIG. 3 shows a flowchart illustrating the operations of communication management program 142 in accordance with an embodiment of the invention. Referring to step S302, communication management program 142 receives a message from a communication client program (i.e. communication client program 112, communication client program 122). In step S304, communication management program 142 determines if the intended recipient communication client program (i.e. communication client program 112, communication client program 122) is in DND status. If the intended recipient communication client program is not in DND status, communication management program 142 proceeds to step S305 wherein the message is sent to the intended recipient communication client program. If the intended recipient communication client program is in DND status, communication management program 142 proceeds to step S306 wherein communication management program 142 determines if the message sender is on the recipient's privileged users list. If the message sender is on the recipient's privileged users list, communication management program 142 proceeds to step S305. If the message sender is not on the recipient's privileged users list, communication management program 142 proceeds to step S308.

Referring to step S308, communication management program 142 determines if the message sending and the message receiving communication client programs (i.e. communication client program 112, communication client program 122) are listed on the same critsit users list. To make this determination, communication management program 142 may query critsit user database 148 for a critsit users list containing the message sending and the message receiving communication client programs. If the message sending and the message receiving communication client programs (i.e. communication client program 112, communication client program 122) are not listed on a common critsit users list, communication management program 142 proceeds to step S309 wherein the message intended for the receiving communication client program is blocked. Furthermore, referring to step S309, communication management program 142 may instruct the message sending communication client program to notify its user that the message has been blocked. If the message sending and the message receiving communication client programs (i.e. communication client program 112, communication client program 122) are listed on a common critsit users list, communication management program 142 proceeds to step S310.

Referring to step S310, communication management program 142 may override the DND status of the involved communication client programs (i.e. communication client program 112, communication client program 122) by instructing them to temporarily add the entries on the critsit users list obtained in step S308 to their respective privileged users list. In an optional embodiment, communication management program 142 may also instruct the involved communication client programs to update their respective user interfaces with a critsit visual indicator for each critsit user on the critsit users list. Additionally, in an optional embodiment, communication management program 142 may instruct the involved communication client programs to prompt their respective users with an option to accept the changes made to their respective privileged users list.

The following example is provided to illustrate the DND override and message relay operation of communication management program 142, and should not be construed as limiting the method performed. In an example embodiment, communication management program 142 receives a message from communication client program 112 intended for communication client program 122. Communication management program 142 gathers static message information (e.g. job title, role, management chain, privileged users list, DND status) from communication client program 112 and communication client program 122, to store in communication program database 146. In the example instance, communication management program 142 queries communication program database 146 and determines that communication client program 122 is in a DND state. Communication management program 142 also determines that communication client program 112 is not listed as a privileged user for communication client program 122. Communication management program 142 then queries critsit user database 148 and determines that communication client program 112 and communication client program 122 are both listed on an existing critsit users list. At this point in the example instance, communication management program 142 determines that the DND state of communication client program 122 should be overridden and instructs communication client program 122 to temporarily add communication client program 112 to its privileged users list. Lastly, communication management program 142 relays the message from communication client program 112 to communication client program 122.

Figure 4:
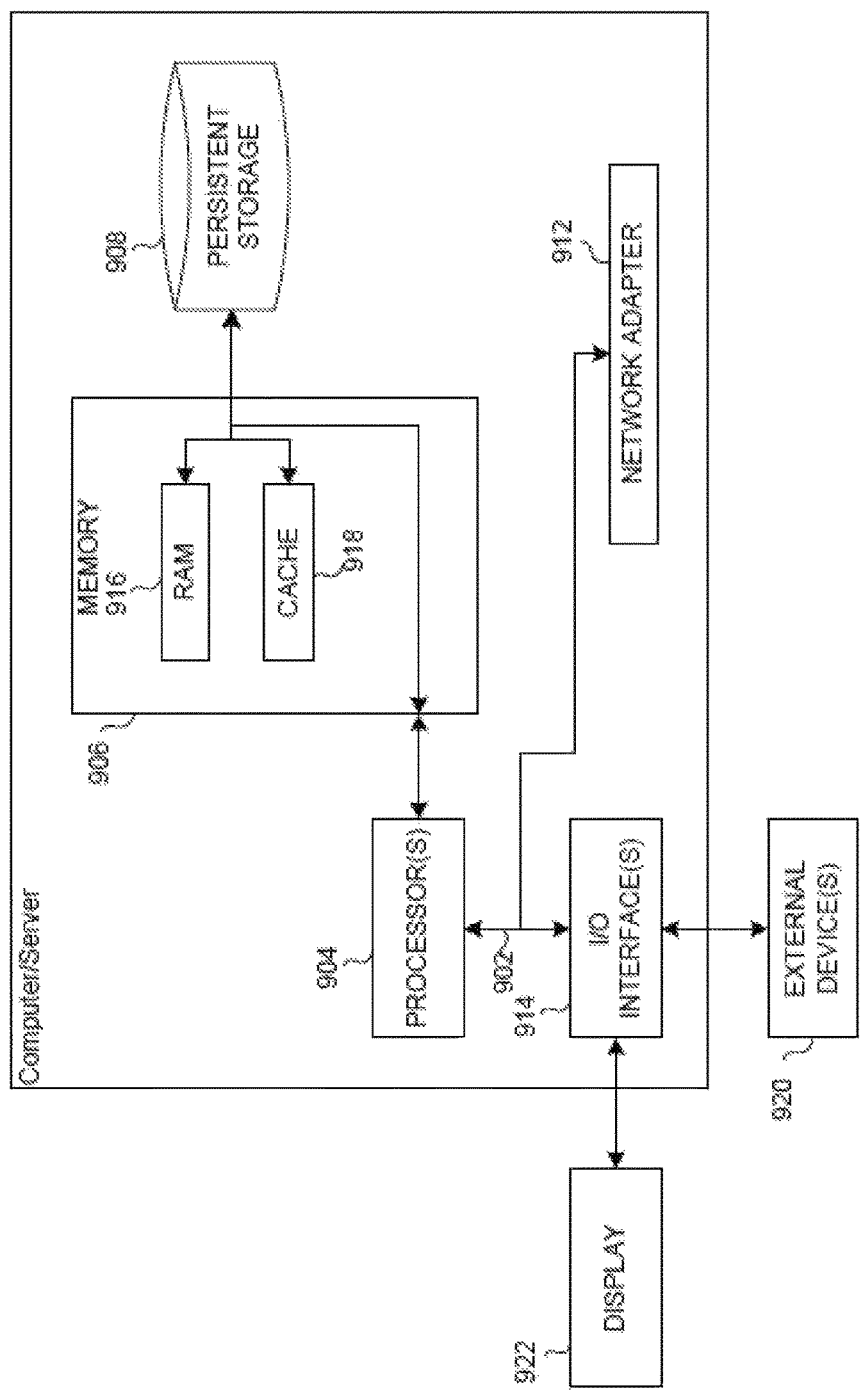
FIG. 4 is a block diagram depicting the hardware components of the DND evaluation system of FIG. 1, in accordance with an embodiment of the invention.

FIG. 4 depicts a block diagram of components of sender computer system 110, receiver computer system 120, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Sender computer system 110, receiver computer system 120, and server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs communication management program 142, DND evaluation program 144, communication program database 146, and critsit user database 148 in server 140; and communication client program 112 in sender computer system 110 and communication client program 122 in receiver computer system 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs communication management program 142, DND evaluation program 144, communication program database 146, and critsit user database 148 in server 140; and communication client program 112 in sender computer system 110 and communication client program 122 in receiver computer system 120 may be downloaded to persistent storage 908 through network adapter 912.

I/O interface(s) 914 allows for input and output of data with other devices that may be connected to server 140, sender computer system 110, and receiver computer system 120. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs communication management program 142, DND evaluation program 144, communication program database 146, and critsit user database 148 in server 140; and communication client program 112 in sender computer system 110 and communication client program 122 in receiver computer system 120, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
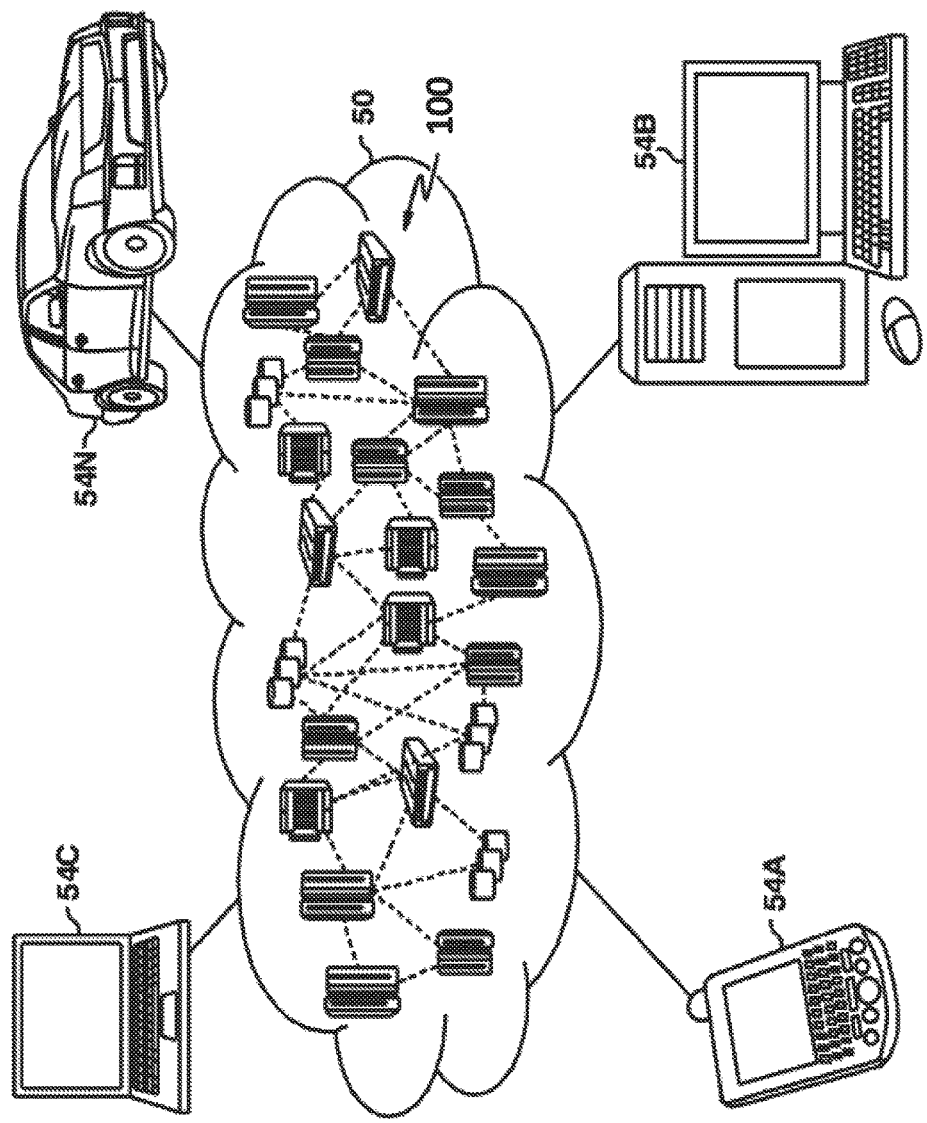
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
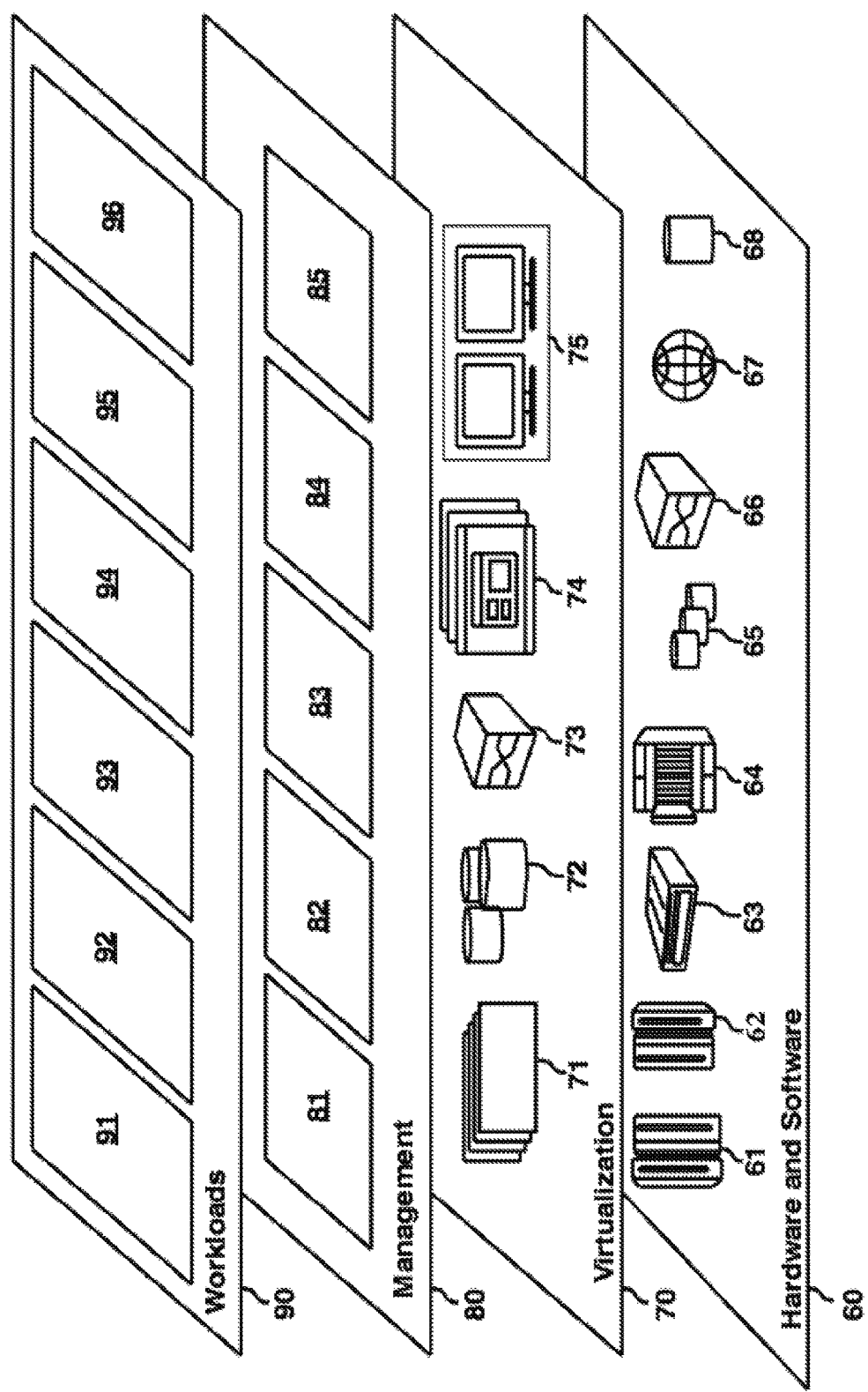
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DND evaluation 96. DND evaluation 96 may relate to automatic and dynamic management of a privileged users list in a communication program.

What is claimed is:

1. A computer system for peer to peer communication, the computer system comprising:

one or more processors, one or more computer-readable memories, one or more computer-readable tangible storage devices, and program instructions stored on at least one of the one or more tangible storage devices for execution by at least one of the one or more processors via at least one of the one or more memories, the program instructions comprising:

program instructions to receive a message, via a communication program, from a first communication program user intended for a second communication program user;

program instructions to determine whether the second communication program user is in a do not disturb state;

based on the second communication program user being in a do not disturb state, program instructions to determine whether to override the do not disturb state of the second communication program user, wherein determining whether to override the do not disturb state comprises:

program instructions to retrieve static message information and communication program user characteristics, wherein the static message information comprises metadata describing the message and content of the message, and wherein the communication program user characteristics comprise individual employment characteristics and individual communication program preferences for the first communication program user and the second communication program user;

program instructions to determine whether a critical situation exists based on the received static message information, wherein determining whether the critical situation exists is performed in response to a timed interval, and wherein determining whether the critical situation exists comprises:

program instructions to parse the received static message information to create a parsed term; and based on determining that the parsed term matches a predefined term, program instructions to determine that the critical situation exists;

in response to the existence of the critical situation, program instructions to determine an importance value for the first communication program user and an importance value for the second communication program user, wherein the importance value for the first communication program user is based on the retrieved communication program user characteristics respective to the first communication program user, and wherein the importance value for the second communication program user is based on the retrieved communication program user characteristics respective to the second communication program user, and wherein program instructions to determine importance values comprises evaluation of weighed values for discrete characteristics within the retrieved communication program user characteristics;

program instructions to compare the importance value for the first communication program user and the importance value for the second communication program user against a minimum threshold value;

based on determining that the importance value for the first communication program user exceeds the minimum threshold value, program instructions to add the first communication program user to a critsit users list, wherein the critsit users list comprises communication program users germane to the critical situation;

based on determining that the importance value for the second communication program user exceeds the minimum threshold value, program instructions to add the second communication program user to the critsit users list;

program instructions to instruct the communication program to update a graphical user interface of the communication program with a visual indicator positioned next to each of the communication program users listed on the critsit users list, wherein the visual indictor identifies a critsit user capable of receiving a message;

based on determining that the first communication program user and the second communication program user are on the same critsit users list, program instructions to override the do not disturb state of the second communication program user; and based on determining to override the do not disturb state of the second communication program user, program instructions to transmit the message from the first communication program user to the second communication program user.

* * * * *